Patented Mar. 8, 1949

2,463,885

UNITED STATES PATENT OFFICE 2,463,885

N-METHYL-l-GLUCOSAMINE AND ACID SALTS THEREOF

Frederick A. Kuehl, Jr., Westfield, Edwin H. Flynn, Rahway, and Karl Folkers, Plainfield, N. J., assignors to Merck & Co., Inc., Rahway, N. J., a corporation of New Jersey No Drawing. Application February 9, 1946, Serial No. 646,702

10 Claims. (Cl. 260—211)

This invention relates to certain new chemical compounds and to processes by which they may be prepared. More particularly, it relates to N-methyl-l-glucosamine, an optically active nitrogeneous compound, as well as to its salts, esters and acyl derivatives. Our invention is also concerned with certain new and improved methods for producing these compounds from readily available starting materials.

The new compounds, which may be prepared in accordance with our invention, are potentially useful intermediates in the preparation of antibiotics which are therapeutically active against gram-positive organisms, including *Bacillus mycoides* and *Bacillus cereus*, and against gram-negative organisms, including *Pseudomonas fluorescens*, *Pseudomonas aeruginosa*, and *Serratia marcescens*.

In preparing N-methyl-l-glucosamine, its salts, esters and acyl derivatives, we may utilize as the starting material either streptobiosamine triethyl mercaptal hydrochloride or methyl streptobiosaminide dimethyl acetal. Methyl streptobiosaminide dimethyl acetal, utilized as a possible starting material, and a method by which it may be prepared, are described and claimed in the copending application of Brink and Folkers, Serial No. 624,334, filed October 24, 1945. The other possible starting material, streptobiosamine triethyl mercaptal hydrochloride, and a process for preparing it are disclosed in the copending application of Kuehl, Serial No. 648,009, filed February 15, 1946.

We have found that N-methyl-l-glucosamine may be secured by the acid hydrolysis of either streptobiosamine triethyl mercaptal hydrocloride, or methyl streptobiosaminide dimethyl acetal, whereby the disaccharide-like molecule is cleaved, resulting in extensive decomposition of one fragment and leaving N-methyl-l-glucosamine intact in the form of its hydrochloride. Acetylation of this compound yields a mixture of α and β pentaacetyl derivatives, which can be readily converted to the α isomer by treatment with zinc chloride and acetic anhydride solution. Or, as an alternative method of separation, the α isomer can be recovered by fractional crystallization from the mixture.

The N-acetyl derivative of N-methyl-l-glucosamine can be prepared by treating N-methyl-l-glucosamine with acetic anhydride in methanol solution. N-methyl-l-glucosamine hydrochloride may be converted to the free base, N-methyl-l-glucosamine by treatment with silver oxide.

It is also possible, in accordance with our invention, to prepare salts of N-methyl-l-glucosamine by treating the free base, N-methyl-l-glucosamine, with the appropriate acid necessary to supply the salt anion. In this way we have prepared, without difficulty, the hydrochloride, oxalate, hydrobromide, and picrate salts of N-methyl-l-glucosamine.

In accordance with our process, either streptobiosamine triethyl mercaptal hydrochloride, or methyl streptobiosaminide dimethyl acetal hydrochloride, each of which can be prepared by the method described in the copending patent applications referred to above, is treated with concentrated hydrochloric acid to yield a dark hydrolysate. This hydrolysate may then be extracted with chloroform to separate decomposition products of the non-nitrogeneous moiety. There results an aqueous solution of crude N-methyl-l-glucosamine hydrochloride. When the crude residue obtained by concentration of the aqueous solution in vacuo is treated with acetic anhydride in pyridine, there results a crystalline mixture of the α and β pentaacetyl derivatives of N-methyl-l-glucosamine.

It is possible to separate the α isomer from this crystalline mixture in one of two ways. The solution may be subjected to a series of fractional recrystallizations, and in this way substantially pure N-methyl-pentaacetyl-α-l-glucosamine is secured. Or the mixture of α and β pentaacetyl derivatives may be converted to one in which the N-methyl-pentaacetyl-α-l-glucosamine predominates by treatment with zinc chloride and acetic anhydride solution.

In preparing N-methyl-l-glucosamine hydrochloride from N-methyl-pentaacetyl-α-l-glucosamine, we treat the latter with dilute hydrochloric acid, such as with 10% hydrochloric acid solution. By treatment with other dilute acids, other acid salts can be secured. The free base, N-methyl-l-glucosamine (streptosamine), if desired, may be secured by treating the N-methyl-l-glucosamine hydrochloride with silver oxide, preferably by treatment with silver oxide in methanol. Reacting the free base with acids results in salts of N-methyl-l-glucosamine, while treatment of the base with acetic anhydride, preferably in a solution containing acetic anhydride and methanol, results in the formation of N-acetyl-N-methyl-l-glucosamine. Obviously other acyl derivatives, such as the propionyl or butyryl, could be secured by the use of appropriate acylating agents in place of acetic anhydride.

In carrying out the first step in our process, the hydrolysis of streptobiosamine triethyl mercaptal hydrochloride, or the hydrolysis of methyl streptobiosaminide dimethyl acetal, or the hydrolysis of a mixture of these two compounds, we generally prefer to reflux the starting material with a concentrated acid, such as concentrated hydrochloric acid, for a period of approximately one hour. However, lesser periods of hydrolysis are also satisfactory, and we have secured satisfactory results with time periods as short as one-half hour, and with periods as long as 2½ hours. It is also possible to utilize, in place of the concentrated acid, a more dilute acid, such as 10% hydrochloric acid, but the use of less concentrated acids is generally not preferred as it renders the isolation of the N-methyl-l-glucosamine from the hydrolysate generally more difficult.

Specific details of the method utilized in carrying out our improved process will be found in the following examples. These examples are intended to be illustrative and not necessarily restrictive of our invention.

*Example 1*

300 milligrams of streptobiosamine triethyl mercaptal hydrochloride, prepared as described in the copending application of Kuehl referred to above, was refluxed with 3 cc. of cencentrated hydrochloric acid for a period of 1½ hours. The resulting dark solution was extracted with chloroform and then treated with a small amount of activated carbon to effect decolorization, filtered, and the clear filtrate then concentrated under reduced pressure. This resulted in a light tan residue. The residue was acetylated in a mixture of 3 cc. of pyridine and 2 cc. of acetic anhydride by allowing it to stand overnight at a temperature of about 5° C.

The bulk of the pyridine and acetic anhydride was removed the following morning by treatment under reduced pressure. The residue was then dissolved in water and the aqueous solution extracted with chloroform. Concentration of the chloroform solution yielded a residue which deposited 55 milligrams of crystals having a melting point of 155–157° C. This crude mixture of the α and β isomers of N-methyl-pentaacetyl-l-glucosamine was recrystallized from a mixture of 10 cc. of ether and 1 cc. of chloroform, thereby yielding pure N-methyl-pentaacetyl-α-l-glucosamine. This compound had a melting point of 161–162° C. Its specific rotation, dissolved in chloroform at a concentration of 0.7%, was $(\alpha)_D = -100°$.

*Example 2*

A solution of 485 milligrams of methyl streptobiosaminide dimethyl acetal in 5 cc. of concentrated hydrochloric acid was refluxed for two hours. The cooled mixture was extracted with 3 cc. of chloroform to remove the oily decomposition products. The aqueous solution was then treated with decolorizing carbon and concentrated in vacuo, yielding 278 milligrams of light tan residue. This product was acetylated in a mixture of 5 cc. of pyridine and 3 cc. of acetic anhydride overnight at 5° C. After removing the solvents by treatment in vacuo, the residue was dissolved in water, and the acetylation product was extracted from the aqueous solution with chloroform. The chloroform extract was washed with water, dried, and concentrated to a residue which deposited 241 milligrams of crystals from ether, M. P. 134–137° C. This product consisted of a mixture of the α and β isomers. Six recrystallizations from chloroform-ether (1:10 mixture) were required to give pure N-methyl-pentaacetyl-α-l-glucosamine, M. P. 160.5–161.5° C. Its specific rotation, dissolved in chloroform at a concentration of 0.7%, was $(\alpha)_D = -100°$.

*Example 3*

About 3.169 grams (M. P. 134–137° C.) of the crude acetylation mixture, prepared as in Example 2, was heated with 1 gram of zinc chloride in 50 cc. of acetic anhydride on the steam bath for one hour. After removing the acetic anhydride in vacuo (pressure less than atmospheric), the residue was dissolved in water and extracted with chloroform. The chloroform residue deposited 2.386 grams of crystals, M. P. 158–160° C. from 1:10 chloroform-ether mixture. One further recrystallization from the same solvents gave the pure N-methyl-pentaacetyl-α-l-glucosamine. The compound had a melting point of 160.5–161.5° C. The yield was 2.195 grams.

*Example 4*

329 milligrams of N-methyl-pentaacetyl-α-l-glucosamine was refluxed in 10 cc. of 10% hydrochloric acid for 2½ hours. Filtration of the light yellow solution through activated charcoal, followed by concentration in vacuo, yielded 190 mg. of N-methyl-l-glucosamine hydrochloride. Recrystallization from ethanol gave the salt in the form of colorless crystals having a melting point of 161–165° C. (with decomposition). When dissolved in water to the extent of 0.6%, the solution had the specific rotation of $(\alpha)_D = -103°$ initial, varying to $(\alpha)_D = -88°$ final.

A partial analysis gave the following: Carbon, 36.80; hydrogen, 7.06; nitrogen, 6.38. The molecular weight was found to be 225.

*Example 5*

623 milligrams of N-methyl-l-glucosamine hydrochloride, dissolved in 10 cc. of methanol was rapidly filtered through an excess of silver oxide. Concentration of the filtrate in vacuo gave a quantitative yield of the free base as a colorless gum. The free N-methyl-l-glucosamine had the specific rotation $(\alpha)_D = -62°$ (dissolved in methanol).

*Example 6*

A solution of 136 milligrams of N-methyl-l-glucosamine hydrochloride in 10 cc. of methanol was filtered through an excess of silver oxide. The resulting solution of the free base was adjusted to a volume of 30 cc. of methanol, and 0.1 cc. of acetic anhydride was added. After standing for four hours at room temperature, the solvent was removed in vacuo. A solution of the residue in chloroform-methanol (10:1 mixture) deposited 61 milligrams of crystals. One recrystallization gave pure N-acetyl-N-methyl-l-glucosamine, M. P. 165–166° C.

Partial analysis gave the following: Carbon, 45.80; hydrogen, 7.53; nitrogen, 6.45.

*Example 7*

A number of salts of N-methyl-l-glucosamine were prepared by adding 1 mole of an acid to 1 mole of N-methyl-l-glucosamine, $C_7H_{15}O_5N$. The N-methyl-l-glucosamine was dissolved in methanol.

By adding hydrochloric acid in equimolar amount, the hydrochloride was produced. The hydrochloride had the specific rotation $$(\alpha)_D = -103°$$

to $-88°$ (water solution).

Similarly the hydrobromide was prepared by adding hydrobromic acid, in equimolar amount, to an ethanol solution of N-methyl-l-glucosamine. The hydrobromide had the specific rotation $(a)_D = -60°$ (methanol solution).

By adding picric acid in equimolar portions to a methanol solution of N-methyl-l-glucosamine, the picrate salt was secured. The oxalate salt of N-methyl-l-glucosamine was similarly prepared, by adding oxalic acid, in equimolar amount, to a methanol solution of the free base.

Various changes and modifications might be made in our invention, as described, without departing from the scope thereof. To the extent that such changes and modified procedures are within the scope of the appended claims, they are to be considered as part of our invention.

We claim:

1. A substance selected from the group which consists of N-methyl-l-glucosamine and the acid salts thereof.
2. N-methyl-l-glucosamine.
3. N-methyl-l-glucosamine hydrochloride.
4. Lower saturated aliphatic acyl derivatives of N-methyl-l-glucosamine.
5. N-methyl-pentaacetyl-l-glucosamine.
6. The process of preparing acid salts of N-methyl-l-glucosamine which comprises hydrolyzing, in strongly acid solution, a compound selected from the group which consists of streptobiosamine triethyl mercaptal salts and methyl streptobiosaminide dimethyl acetal.
7. The process of preparing N-methyl-l-glucosamine hydrochloride which comprises hydrolyzing streptobiosamine triethyl mercaptal hydrochloride in concentrated hydrochloric acid.
8. The process of preparing N-methyl-l-glucosamine hydrochloride which comprises hydrolyzing methyl streptobiosaminide dimethyl acetal in concentrated hydrochloric acid.
9. The process of preparing N-methyl-pentaacyl-l-glucosamine derivatives which comprises acylating N-methyl-l-glucosamine utilizing, as the acylating agent, an anhydride of a lower aliphatic acid.
10. The method of preparing N-acetyl-N-methyl-l-glucosamine which comprises acylating N-methyl-l-glucosamine with acetic anhydride in the presence of a lower aliphatic alcohol.

FREDERICK A. KUEHL, JR.
EDWIN H. FLYNN.
KARL FOLKERS.

No references cited.